United States Patent [19]

Leuenberger

[11] Patent Number: 4,990,249

[45] Date of Patent: Feb. 5, 1991

[54] APPARATUS FOR THE DESLUDGING OF BATHS

[75] Inventor: Andreas Leuenberger, Biel-Benken, Switzerland

[73] Assignee: Ciba-Geigy AG, Basel, Switzerland

[21] Appl. No.: 486,371

[22] Filed: Feb. 27, 1990

[30] Foreign Application Priority Data

Mar. 2, 1989 [CH] Switzerland ............................ 774/89

[51] Int. Cl.⁵ .............................................. B01D 24/00
[52] U.S. Cl. .................... 210/167; 210/258; 210/196; 210/416.1
[58] Field of Search .............. 210/258, 167, 196, 416.1

[56] References Cited

U.S. PATENT DOCUMENTS

| 2,450,006 | 9/1948 | Lesniak | 210/149 |
| 4,233,159 | 11/1980 | Senda et al. | 210/413 |
| 4,287,064 | 9/1981 | Ando et al. | 210/413 |
| 4,297,213 | 10/1981 | Airey et al. | 210/196 |
| 4,830,761 | 5/1989 | Leach et al. | 210/258 |

FOREIGN PATENT DOCUMENTS 2050855 1/1981 United Kingdom.

Primary Examiner—Bernard Nozick
Attorney, Agent, or Firm—Burns, Doane, Swecker & Mathis

[57] ABSTRACT

An apparatus for the desludging of baths includes a separation part with an oblique sieve filter containing a plurality of essentially horizontal slots. A side of the slots over which soiled liquid runs is covered by a filter cloth placed on the sieve plate and consisting of a polyester monofilament filter fabric with a mesh width smaller than the width of the slots between the sieve rods of the oblique sieve. The combination of the filter fabric of the filter cloth and the slots of the oblique sieve yields in spite of the filtering of small solid particles, a high liquid throughput.

6 Claims, 3 Drawing Sheets

APPARATUS FOR THE DESLUDGING OF BATHS

BACKGROUND OF THE INVENTION

The invention relates to an apparatus for the desludging of baths, in particular the freeing of tick immersion baths for cows from solid particles introduced by the animals. Such an apparatus includes a suction tube immersible in the liquid, a pump and a preliminary basin fed by the pump and equipped with an overflow passing the liquid to be purified to the upper edge of a sieve plate mounted obliquely relative to the direction of gravity and retaining the solid particles. The sieve plate is provided with a plurality of slots extending essentially transversely relative to the direction of flow, with a collector basin being located underneath the sieve plate for the filtered liquid, the basin being connected by means of a drain with the bath to be purified.

An apparatus of this type, with an inclined metal sieve for the separation of solids from aqueous liquids has already been used in various fields, in particular for the preliminary settling of municipal waste waters, the fine precipitation of slaughterhouse sewage, the separation of fibers in textile plants and in paper mills.

In tropical countries it is necessary to free domestic animals, in particular cows, regularly from pathogenic organisms in order to prevent the propagation of epidemics. In East Africa, cows are driven twice weekly through tick baths which contain insecticide, however, in the process the cows contaminate the bath with dirt adhering to body parts, and with their own excrements. In particular, the soil material adhering to the hooves of the cows is introduced in the bath and settles on the bottom in the form of a sludge.

The immersion baths for cows contain about 20,000 liters of water and about 0.2% insecticide. After about 50,000 to 100,000 cows have dragged sand, stones, soil and other foreign substances into the bath, it must be cleaned. For this, heretofore immersion baths of this type were completely emptied once or twice a year to remove the bottom sludge from the basin. In the case of a sludge component of about 10%, 2,000 liter sludge must be removed in this manner. In view of the large water and sludge volumes, the process presently followed is cumbersome and involves high losses relative to water and time, as during the emptying and refilling of the basin it is not possible to bathe the animals to protect them against disease.

Based on this state of the art it is the object of the invention to provide an apparatus to make it possible to free a sludge containing bath of even small solid particles, within a short period of time and without interrupting the operation.

SUMMARY OF THE INVENTION

This object is attained according to the invention by providing a sieve plate for an apparatus of the aforementioned type which is in the form of a ribbed support plate for placement of a filter cloth of a tight mesh plastic fabric upon it.

With known sieve plates, the suspension flowing in a parallel manner rapidly downward over the sieve plate, the bottom layer of the water is always conducted by means of the Coanda effect downward through the sieve slots to the collector basin. The solids are separated because, in view of their mass inertia, they do not follow the rapid reversing motion of the liquid and accumulate on the surface of the sieve plate, where they are further dewatered and from where they finally drop at the lower edge of the sieve plate over a discharge edge into a solids collector vessel. However, the prevailing flow conditions cannot prevent the development of a certain back-up, so that the flow velocity of the purified liquid is limited. But an additional capillary effect is provided by the filter cloth of a tight mesh plastic fabric pressed by its own weight and the running liquid onto the sieve plate, together with an advantageously modified flow of the liquid and the solid particles. In this manner, the placing of the filter cloth of a tight mesh plastic fabric results in an increased flow volume, even if the solids to be precipitated are of a certain minimium size.

The filter cloth placed on the sieve plate located obliquely relative to the direction of gravity preferably is a polyester monofilament filter fabric, the mesh width of which is smaller than the slot width at the narrowest location of slots between the sieve rods of the sieve plate. The rods preferably have a triangular profile, so that the slots widen in the direction of the collector basin, for which reason the flow velocity is highest in the area of the mesh openings of the filter cloth. It was discovered that by means of the synergy effect produced in this manner both a high flow volume and the precipitation of relatively small particles is possible simultaneously.

In a preferred exemplary embodiment, the filter fabric has a mesh opening of about 177 micrometers and the sieve plate has a slot width of about 500 micrometers. Depending on the properties of the ground on which the cows are living, the mesh opening of the filter fabric may amount to 100 to 250 micrometers. The slot width of the sieve plate, which is mounted at an inclination relative to the vertical of 20° to 50°, may be between 250 and 1,500 micrometers. Experiments indicated that neither the sieve plate alone nor the filter fabric alone, have the advantageous combination effect of the sieve plate with the filter fabric placed on it.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF PREFERRED EMBODIMENTS

Figure 1:
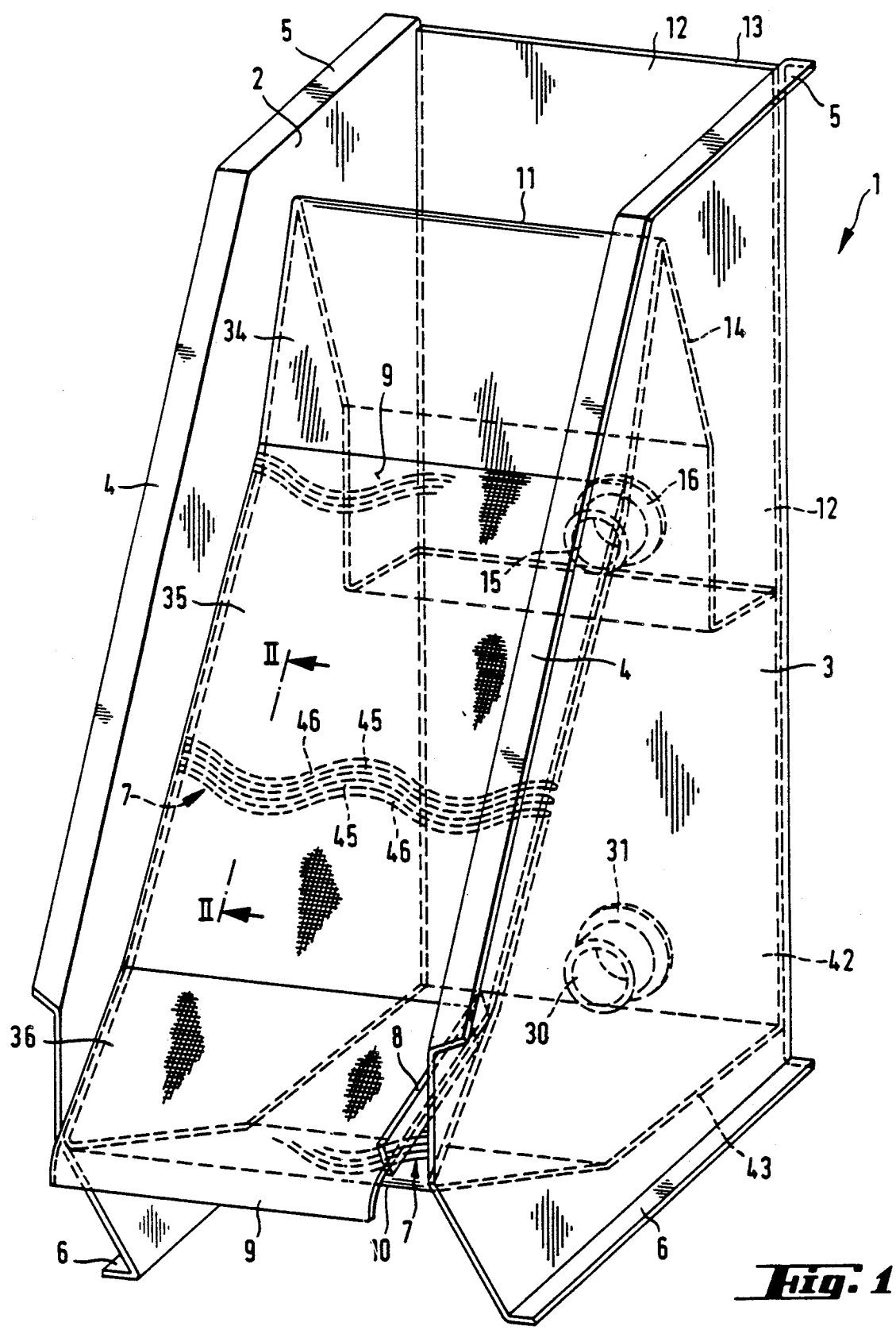
FIG. 1. shows the separation part of the apparatus for the desludging of baths in a perspective view.

FIG. 1 shows a separation part 1, which is made essentially from a sheet of an alloy steel and is provided with a left side wall 2 and a right side wall 3. To rigidize the side walls, borders 4,5 and 6 are provided, with the border 6 also serving to fasten the separation part to a trailer, not shown in the drawing, together with the vehicle for the towing of said trailer. The transport trailer makes it possible to move the separation part 1 and the materials additionally required to the site in a rapid and simple manner.

Figure 3:
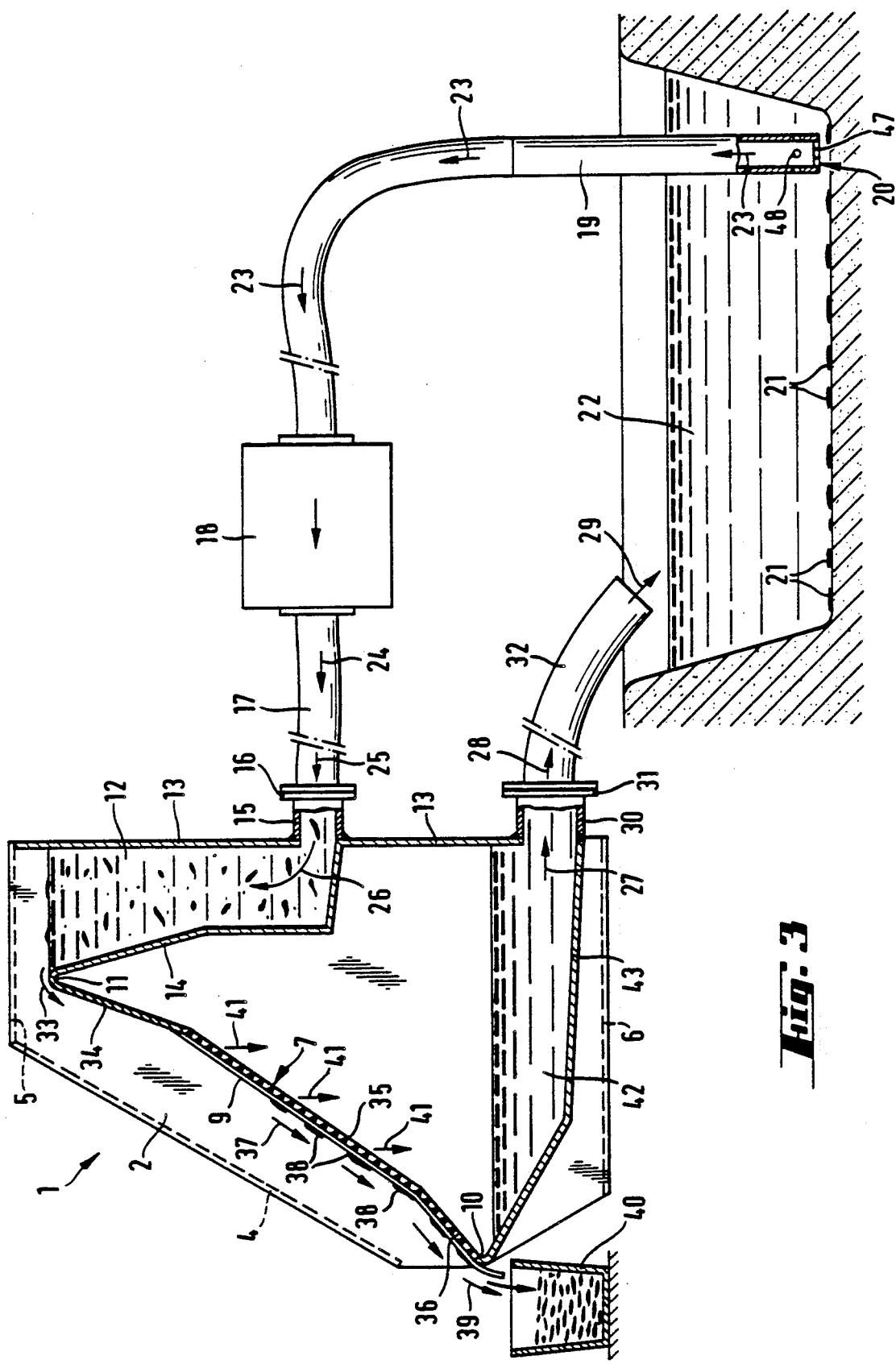

Between the left side wall 2 and the right side wall 3, a sieve plate 7 is located. The FIG. 1 sieve plate is covered, with the exception of a small portion located to the right adjacent to a deflector 8, by a filter cloth 9 hanging over the lower edge 10 of the sieve plate 7 or an extension of said sieve plate 7. The upper edge 11 of the sieve plate 7 or an extension plate of the sieve plate, forms an overflow for a preliminary basin 12, shown in section in FIG. 3. The preliminary basin 12 extends on the one hand between the left side wall 2 and the right side wall 3, and on the other hand, between a rear wall 13 and a partition 14 of the separation part 1 of the apparatus for the desludging of baths.

The preliminary basin 12 is equipped with an inlet 15 with a flange connector 16, which makes it possible to connect a flexible PVC hose 17 with a diameter of, for example, 8 cm. The PVC hose 17 is connected with the outlet of a pump 18, in particular a centrifugal pump driven by a diesel engine, permitting a volume flow of 800 liters per minute. The pump 18 is mounted, together with the separation part 1, on a trailer, not shown, by means of vibration damping rubber buffers.

To the suction inlet of the pump 18, a suction tube 19 with a diameter of 8 cm is connected; its suction opening 20 is covered with a screen 47 to prevent the entry of stones with a diameter larger than 4 cm. About 5 to 10 cm from the suction opening 20, approximately 6 holes 48 with diameters of 2 to 3 cm are provided in the suction tube 19 in order to prevent the clogging of the suction tube 19 upon its immersion in the sludge particles 21.

The suction tube 19 is lowered with its suction orifice 20 into the vicinity of the bottom of an immersion bath 22, into which the cows are jumping to be disinfected and from which the animals can leave by way of stairs, not shown. The immersion bath 22 contains, for example, 20,000 liters. The depth of the water is chosen so that any injury to the animals is prevented and complete bathing is assured. The dimensions are selected so, that the animals have sufficient contact time before they reach the stairs to leave the bath 22.

The water containing the sludge suctioned off by the pump 18 from the bath passes in the direction of the arrows 23, 24, 25 and 26 into the preliminary basin 12 of the separation part 1. The filtered liquid leaves the separation part in the direction of the arrows 27, 28 and 29. In correspondence with the inlet 15, the separation part 1 has an outlet 30 with a flange connector 31, to which a plastic pipe 32 having a diameter of, for example, 30 cm may be connected, and through which the filtered liquid flows back by gravity into the bath 22.

This circulation results in considerable savings in water, and the specific configuration of the separation part 1 provides a high specific throughput. The preliminary basin 12 has an overflow at the upper edge 11 of the sieve plate 7 and the partition 14, over which the soiled liquid runs over in the direction of the arrow 33. The upper part 34 of the sieve plate 7 may be steeper than the center part 25 and the lower part 36, which together with the upper part 34 may be made impermeable. The soiled liquid passes along the arrow 37 onto the center part 35 of the sieve plate covered with the filter cloth 9, wherein the solids accumulate and slide down in small heaps 38 along the surface of the filter cloth 9, until they drop at the location indicated by the arrow 39 into a solids collector vessel 40.

The liquid separated from the solids falls in the direction of the arrows 41 into a collector basin 42 equipped with a bottom plate 43 extending between the side walls 2 and 3. The collector basin 42 is drained by an outlet 30.

Figure 2:
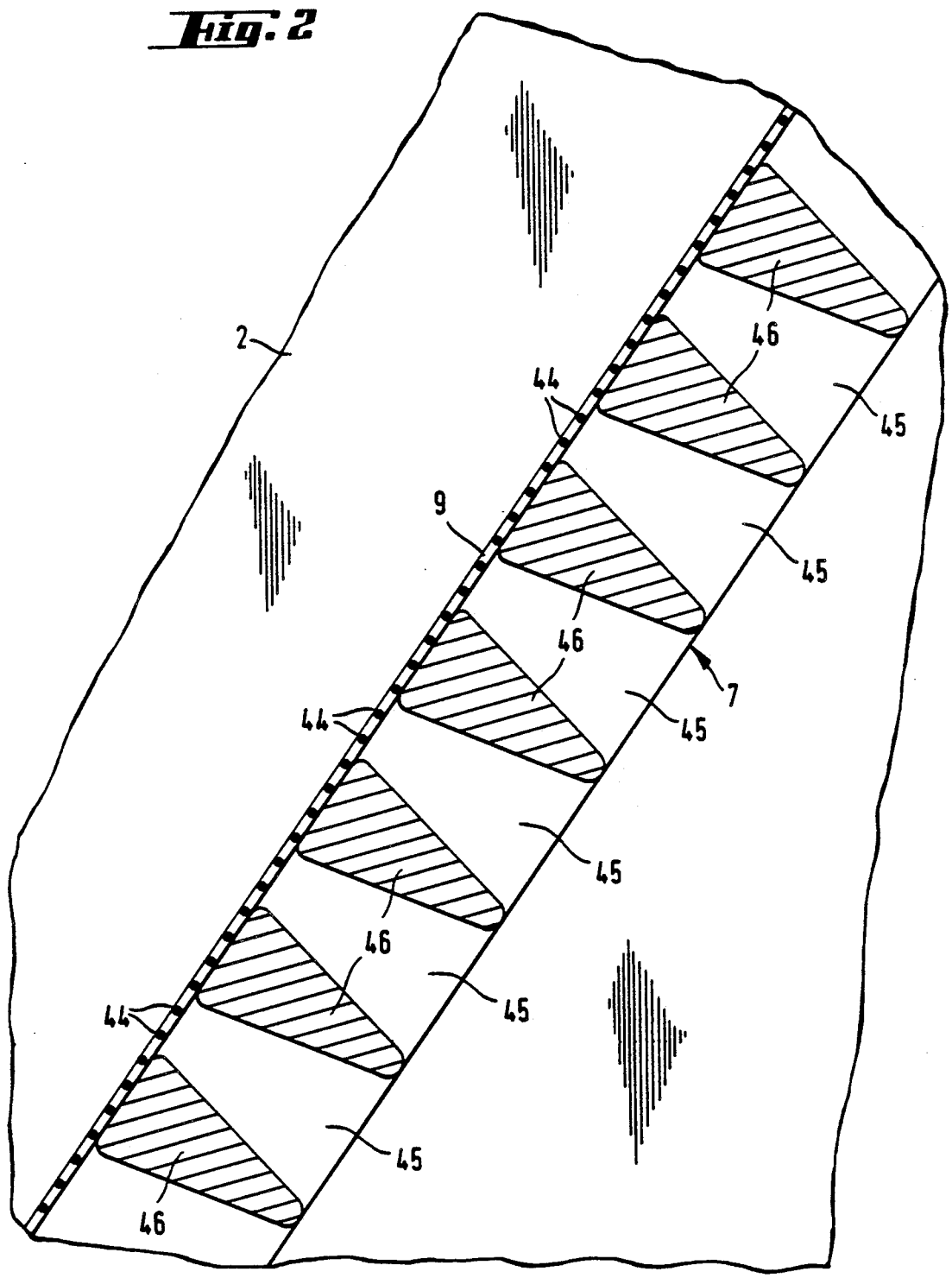
FIG. 2. shows a detail of a cross section through the sieve plate of the apparatus on the line II—II of FIG. 1; and, FIG. 3. a schematic view of the apparatus in cross section.

FIG. 2 shows, greatly enlarged, a detail of the sieve plate 7 and the filter cloth 9 upon it in cross section. FIG. 2 clearly shows the manner in which the sieve plate acts as the support for the filter cloth 9, the filaments 44 of which are indicated in the cross section by a plurality of points. The individual filaments 44 of the filter cloth 9 form a tight mesh, with a mesh opening of, for example, 100 to 250 micrometers and preferably 177 micrometers. The filter cloth 9 preferably consists of a polyester monofilament filter fabric, which does not become saturated as do the natural fibers, which cannot be used.

The filament diameter of the fabric filaments 44 indicated by points in cross section in FIG. 2, amounts to 60 to 200 micrometers. The number of filaments per square cm is between 25 and 60. The free surface of the fabric of the filter cloth is between 15 and 40%. Depending on the fabric used, its thickness is 100 to 300 micrometers. The polyester monofilament filter fabrics have weights per unit area of 60 to 200 g/m$^2$. The choice of the fabric for the filter cloth 9 depends on the properties of the sludge and the minimum throughput volume required.

In case of a mesh opening of 177 micrometers it is appropriate to dimension the slot width of the slots between the sieve rods of the sieve plate from between 250 to 1500 micrometers. In a preferred embodiment, the narrowest location is dimensioned as a multiple of the mesh width of the filter fabric; e.g., about 500 micrometers. FIG. 2 clearly shows the triangular profile of the sieve rods, which preferably are made of stainless steel. The slots extend in a horizontal, sinusoidal corrugation between the side walls, which are located at a distance of about 60 cm. The length of the area provided with sieve rods between the side walls is, for example 1.2m. The inclination of the sieve plate is conveniently 20° to 50° relative to the vertical.

The filter cloth may be fastened in the vicinity of the upper edge of the sieve plate or the partition. The combination of the filter cloth and the sieve plate is self-cleaning, whereby the manipulation of the separation part is greatly simplified.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Apparatus for the desludging of baths, in particular for the freeing of tick immersion baths for cows, from solid particles introduced by the animals, comprising:
   a suction tube immersible in liquid;
   a pump and a preliminary basin supplied by said pump, said basin being equipped with an overflow conducting the liquid to be purified to the upper edge of a sieve plate extending obliquely relative to the direction of gravity and retaining the solid particles, said plate being provided with a plurality of slots extending essentially transversely to the direction of flow; and, a collector basin located under the sieve plate for receiving the filtered liquid and connected by means of a drain with the bath, the sieve plate being designed to provide ribbed support for a filter cloth of a tight mesh plastic fabric placed upon it.

2. Apparatus according to claim 1, wherein the filter cloth placed onto the sieve plate is a polyester monofilament filter fabric.

3. Apparatus according to claim 2, wherein the sieve plate comprises a plurality of sieve rods with triangular profiles, wherein the slots are larger at the discharging side of the sieve plate and have a minimum width amounting to a multiple of the mesh width of the filter fabric of the filter cloth.

4. Apparatus according to claim 3, wherein the width of the slots of the sieve plate is dimensioned from 250 to 1,500 micrometers and the mesh opening of the filter fabric of the filter cloth is dimensioned from 100 to 250 micrometers.

5. Apparatus according to claim 4, wherein the filter fabric has a mesh opening of approximately 177 micrometers and the sieve plate has a slot width of approximately 500 micrometers.

6. Apparatus according to claim 5, wherein an angle of inclination of the sieve plate with the filter cloth located on it is offset 20° to 50° relative to its vertical.

* * * * *